(12) United States Patent
Bae et al.

(10) Patent No.: US 10,348,135 B2
(45) Date of Patent: Jul. 9, 2019

(54) CHARGING CONTROL DEVICE, CHARGING CONTROL METHOD AND WIRELESS POWER RECEIVING DEVICE EQUIPPED WITH SAME

(71) Applicant: LG INNOTEK CO., LTD., Seoul (KR)

(72) Inventors: Su Ho Bae, Seoul (KR); Dong Ho Yong, Seoul (KR); Do Hyun Won, Seoul (KR); Jong Heon Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/053,987

(22) Filed: Aug. 3, 2018

(65) Prior Publication Data

US 2018/0342902 A1 Nov. 29, 2018

Related U.S. Application Data

(63) Continuation of application No. 15/021,593, filed as application No. PCT/KR2014/008544 on Sep. 12, 2014, now Pat. No. 10,069,343.

(30) Foreign Application Priority Data

Sep. 13, 2013 (KR) .................. 10-2013-0110563

(51) Int. Cl.
*H02J 50/12* (2016.01)
*H02J 50/80* (2016.01)
(Continued)

(52) U.S. Cl.
CPC ............... *H02J 50/12* (2016.02); *H02J 5/00* (2013.01); *H02J 7/0068* (2013.01); *H02J 7/025* (2013.01);
(Continued)

(58) Field of Classification Search
None
See application file for complete search history.

(56) References Cited

U.S. PATENT DOCUMENTS

| 6,301,128 B1 | 10/2001 | Jang et al. |
| 6,472,857 B1 | 10/2002 | Genest et al. |

(Continued)

FOREIGN PATENT DOCUMENTS

| CN | 102170178 A | 8/2011 |
| JP | 7-288981 A | 10/1995 |

(Continued)

OTHER PUBLICATIONS

International Search Report issued in PCT/KR2014/008544, dated Jan. 8, 2015.

*Primary Examiner* — Jeffery S Zweizig

(74) *Attorney, Agent, or Firm* — Birch, Stewart, Kolasch & Birch, LLP

(57) ABSTRACT

A charging control device includes a capacitor, a comparison unit and a switching unit. The capacitor is charged with a voltage converted from power received from a wireless power sending device. The comparison unit compares the voltage of the capacitor with a reference voltage, and generates an output signal according to the result of the comparison. The switching unit is connected to the front end of the capacitor and is switched by the output signal from the comparison unit so as to control whether to supply the converted voltage to a load terminal.

16 Claims, 13 Drawing Sheets

(51) Int. Cl.
  *H02J 5/00* (2016.01)
  *H02J 7/02* (2016.01)
  *H02J 7/00* (2006.01)
  *H02J 7/04* (2006.01)
  *H02J 7/34* (2006.01)

(52) U.S. Cl.
  CPC .............. *H02J 7/045* (2013.01); *H02J 50/80*
    (2016.02); *H02J 7/345* (2013.01)

(56) References Cited

U.S. PATENT DOCUMENTS

| | | | |
|---|---|---|---|
| 6,987,678 B2 | 1/2006 | Giandalia et al. | |
| 8,169,185 B2 | 5/2012 | Partovi et al. | |
| 8,217,621 B2 | 7/2012 | Tsai et al. | |
| 9,030,052 B2 * | 5/2015 | Kim ................... | H04B 5/0031 307/104 |
| 9,172,434 B2 | 10/2015 | Kwon et al. | |
| 9,391,535 B2 | 7/2016 | Yeo et al. | |
| 10,044,226 B2 * | 8/2018 | Watanabe ............... | H02J 5/005 |
| 2004/0130913 A1 | 7/2004 | Giandalia et al. | |
| 2012/0328043 A1 | 12/2012 | Kwon et al. | |
| 2013/0049482 A1 | 2/2013 | Rofe et al. | |
| 2013/0099591 A1 | 4/2013 | Yeo et al. | |
| 2013/0214611 A1 | 8/2013 | Bae | |

FOREIGN PATENT DOCUMENTS

| | | |
|---|---|---|
| JP | 2006-50852 A | 2/2006 |
| JP | 2007-336717 A | 12/2007 |
| JP | 2012-531176 A | 12/2012 |
| KR | 10-2013-0006826 A | 1/2013 |
| KR | 10-2013-0044647 A | 5/2013 |
| KR | 10-2013-0045167 A | 5/2013 |
| KR | 10-2013-0095906 A | 8/2013 |
| WO | WO 2013/128641 A1 | 9/2013 |

* cited by examiner

[FIG. 1]
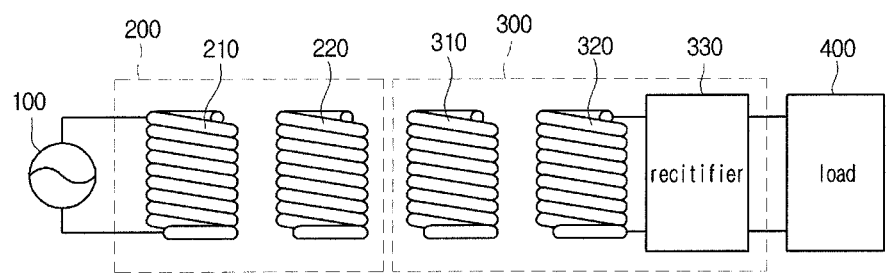
[FIG. 2]
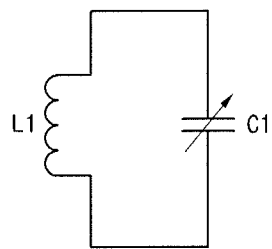
[FIG. 3]
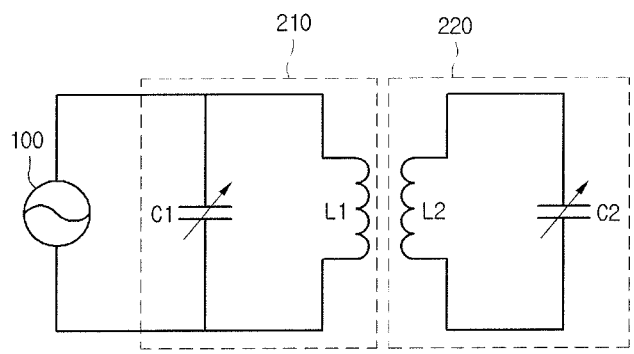

[FIG. 4]
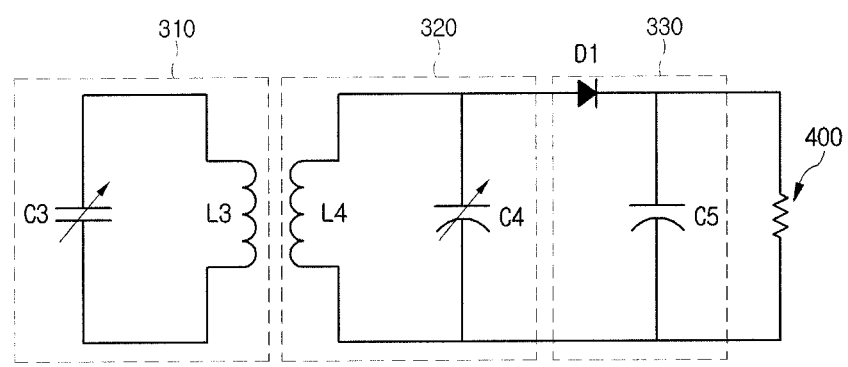

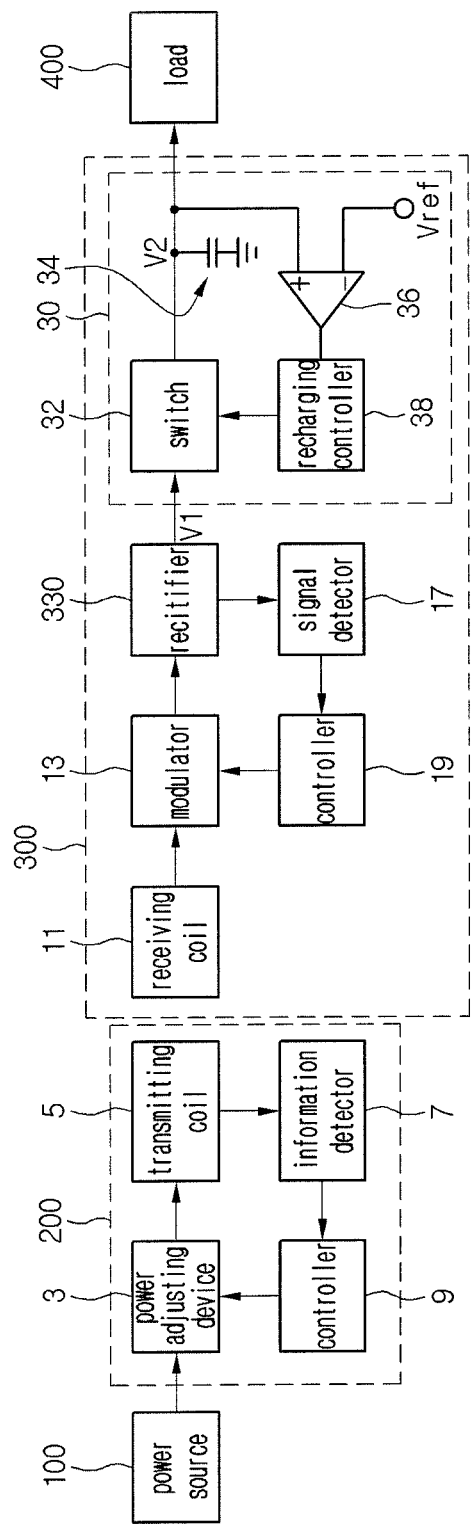
[FIG. 5]

【FIG. 6】
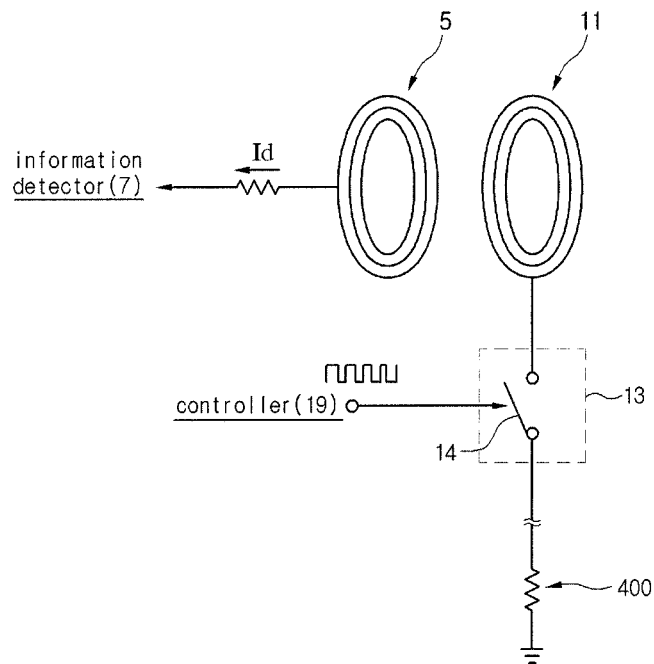
【FIG. 7a】
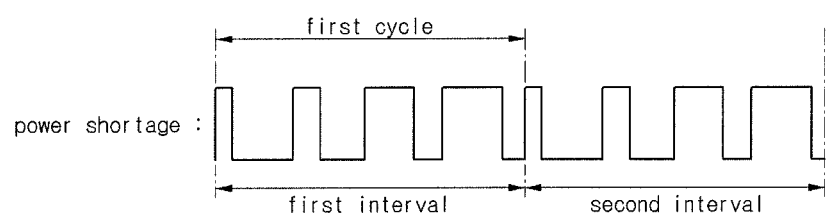
【FIG. 7b】
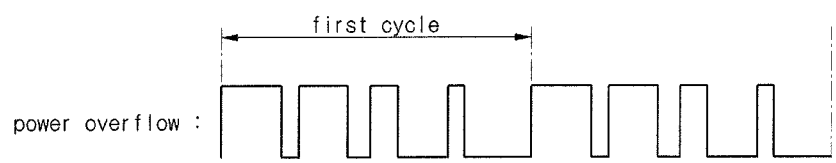

[FIG. 7c]
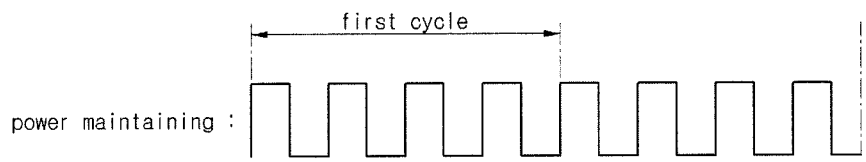
[FIG. 8a]
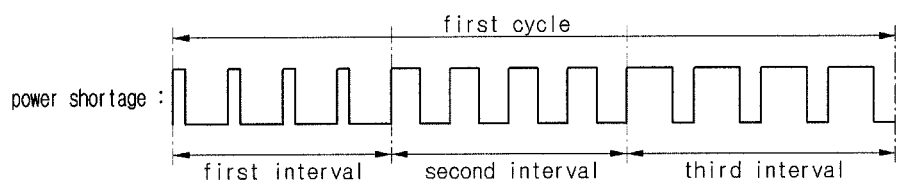
[FIG. 8b]
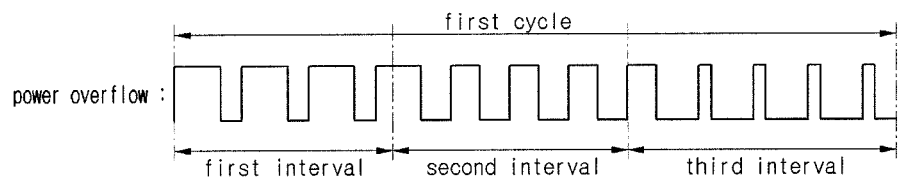
[FIG. 8c]
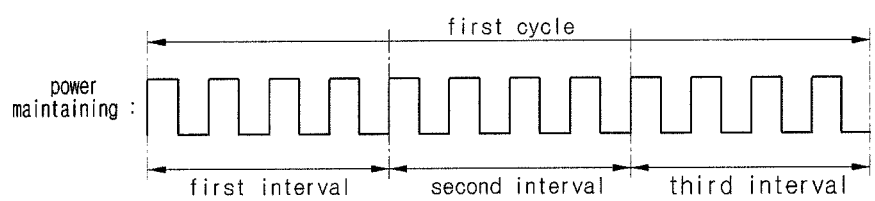

[FIG. 9a]
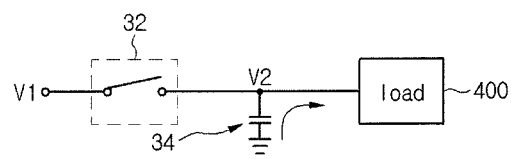
[FIG. 9b]
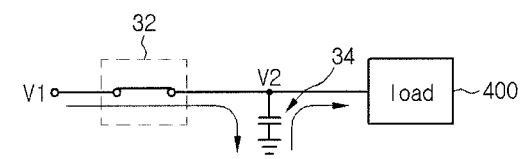

【FIG. 10a】
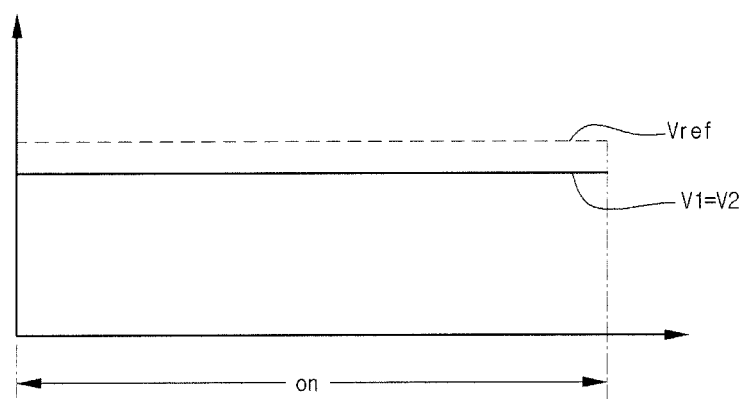
【FIG. 10b】
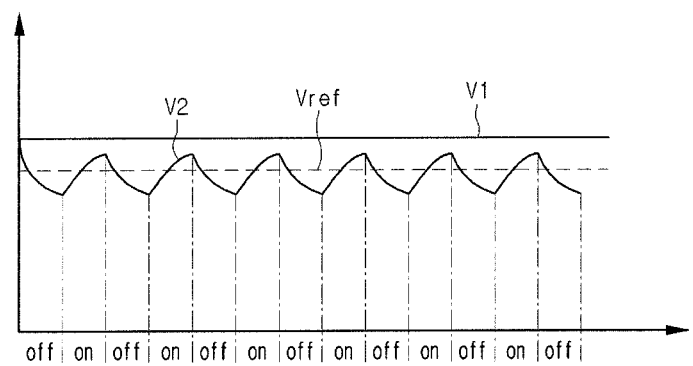

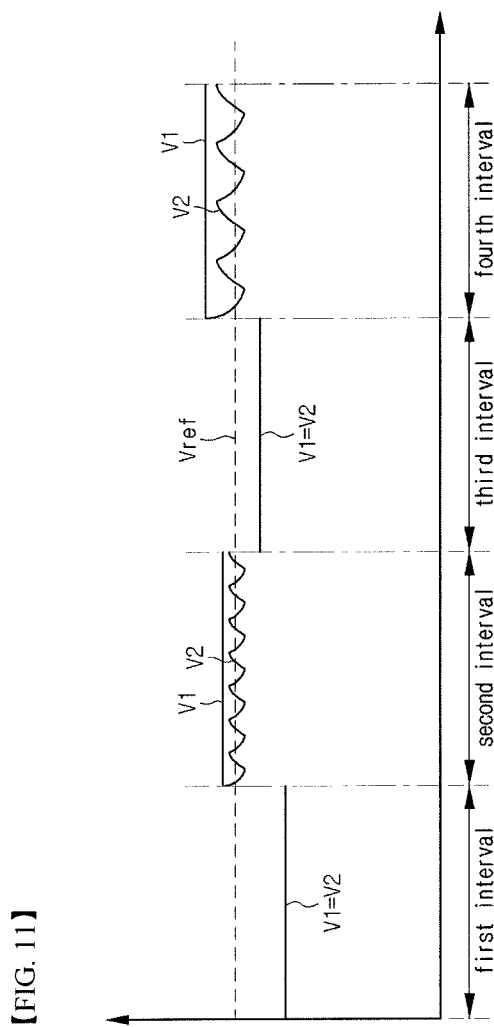
[FIG. 11]

【FIG. 12】
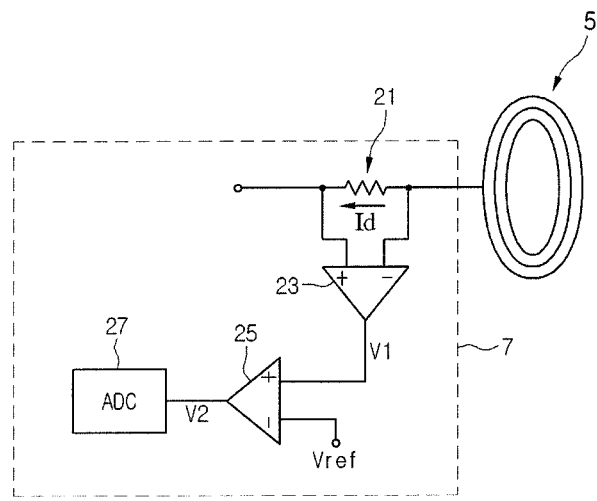
【FIG. 13a】
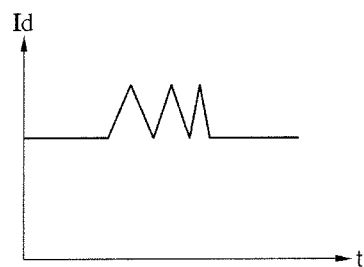
【FIG. 13b】
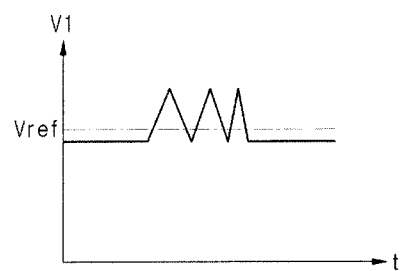

[FIG. 13c]
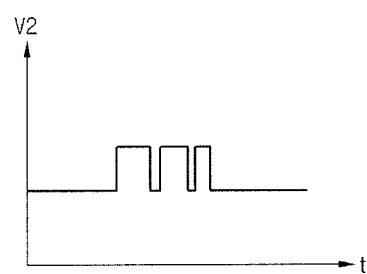

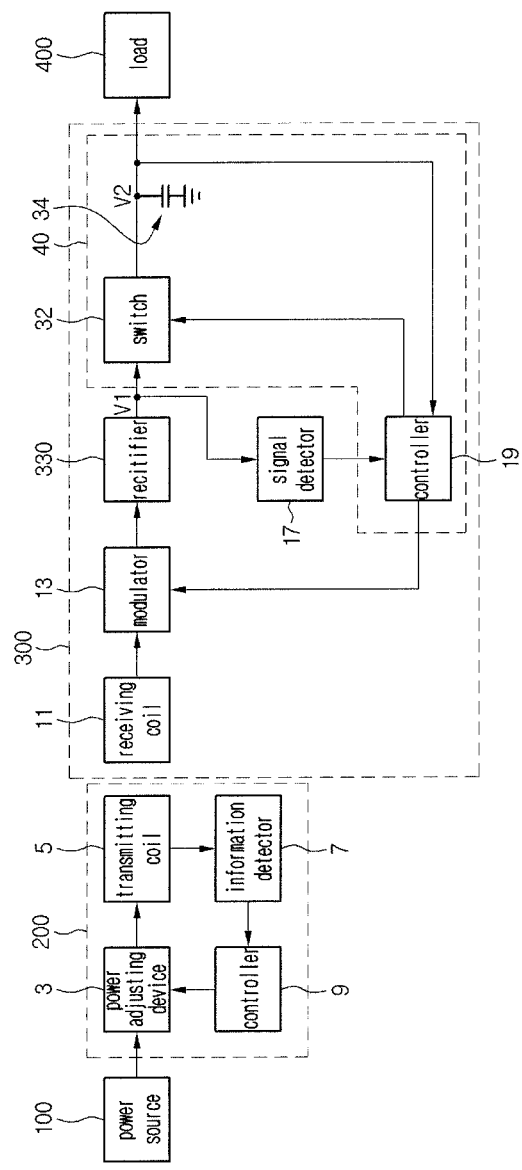
[FIG. 14]

[FIG. 15]
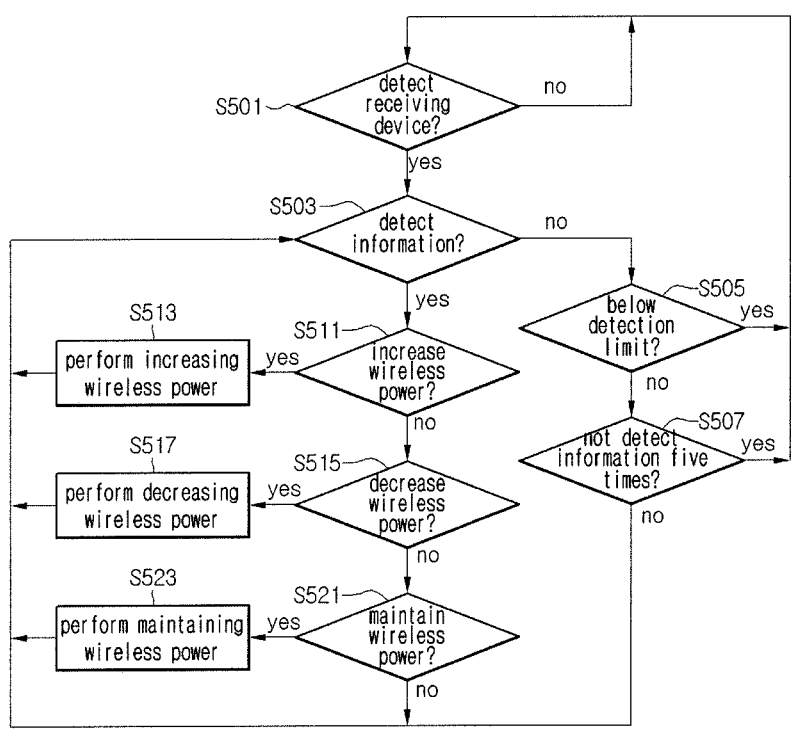

[FIG. 16]
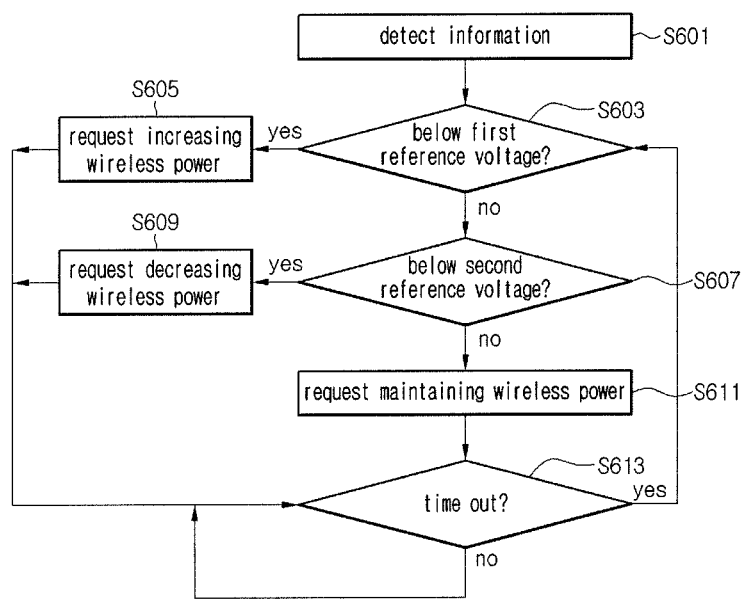

CHARGING CONTROL DEVICE, CHARGING CONTROL METHOD AND WIRELESS POWER RECEIVING DEVICE EQUIPPED WITH SAME

CROSS REFERENCE TO RELATED APPLICATIONS

This application is a Continuation application of U.S. application Ser. No. 15/021,593 filed on Mar. 11, 2016, which is a the National Phase of PCT International Application No. PCT/KR2014/008544, filed on Sep. 12, 2014, which claims priority under 35 U.S.C. 119(a) to Patent Application No. 10-2013-0110563, filed in the Republic of Korea on Sep. 13, 2013, all of which are hereby expressly incorporated by reference into the present application.

TECHNICAL FIELD

The embodiment relates to a wireless power transmission technique.

BACKGROUND ART

Recently, a wireless power transmission or a wireless energy transfer for wirelessly transferring electric energy to desired devices has been actively researched and developed.

In order to use the wireless power transmission, a transmitting terminal for transmitting wireless power and a receiving terminal for receiving the transmitted wireless power may be provided.

Meanwhile, if the wireless power is indefinitely supplied to the receiving terminal, the receiving terminal may be damaged. Especially, an object to be charged may be damaged due to over voltage.

In this regard, a technique for controlling the charging of the receiving terminal is disclosed in U.S. Pat. No. 8,217,621.

However, according to the above patent document, a power generating unit, which has a complex structure to generate a predetermined low-voltage power supply, is necessary so that the charging control is inefficient.

DISCLOSURE

Technical Problem

The embodiment provides a charging control method and a charging control device, capable of improving the charging efficiency.

The embodiment provides a charging control method and a charging control device, capable of ensuring the charging safety.

The embodiment provides a charging control device having a simple configuration.

The embodiment provides a wireless power receiver having the charging control device.

Technical Solution

According to the embodiment, a charging control device for charging a load with a voltage converted from a power received from a wireless power transmitter includes: a capacitor charged with the converted voltage; a comparator that compares a voltage of the capacitor with a reference voltage and generates an output signal based on the comparison result; and a switch connected to a front end of the capacitor and switched based on the output signal of the comparator to control a supply of the converted voltage to the load.

According to the embodiment, there is provided a charging control method in a device including a capacitor and a switch connected to a front end of the capacitor for charging a load with a voltage converted from a power received from a wireless power transmitter, in which the charging control method includes: charging the capacitor with the converted voltage; comparing a voltage of the capacitor with a reference voltage and generating an output signal according to the comparison result; and switching the switch based on the output signal to control a supply of the converted voltage to the load.

According to the embodiment, a wireless power receiver for transferring a power received from a wireless power transmitter to a load includes: a receiving coil for receiving an AC power from the wireless power transmitter; a rectifier for rectifying the AC power into a DC voltage; a capacitor charged with the rectified DC voltage; a comparator that compares a voltage of the capacitor with a reference voltage and generates an output signal based on the comparison result; and a switch connected between the rectifier and the capacitor and switched based on the output signal of the comparator to control a supply of the DC voltage to the load.

According to the embodiment, a wireless power receiver for transferring a power received from a wireless power transmitter to a load includes: a receiving coil for receiving an AC power from the wireless power transmitter; a rectifier for rectifying the AC power into a DC voltage; a capacitor charged with the rectified DC voltage; a controller that compares a voltage of the capacitor with a reference voltage and generates a control signal based on the comparison result; and a switch connected between the rectifier and the capacitor and switched based on the control signal of the controller to control a supply of the DC voltage to the load.

Advantageous Effects

According to the embodiment, over voltage supplied to the load can be blocked to protect the load so that the charging safety can be secured.

According to the embodiment, since the over voltage is converted into charging voltage while the over voltage is being supplied, the charging voltage can be continuously supplied to the load even if the over voltage is blocked, so that the charging efficiency can be improved at the load and the charging time can be shortened.

The embodiment includes only the switch and the capacitor and the switch can be controlled by using voltage of the capacitor in order to block voltage supplied to the load, so that the configuration can be simplified and the additional cost may not be caused.

Meanwhile, other various effects will be directly or implicitly described below in the detailed description of the embodiments.

DESCRIPTION OF DRAWINGS

FIG. 1 is a view illustrating a wireless power transmission system according to an embodiment.

FIG. 2 is an equivalent circuit diagram of a transmitting induction coil according to an embodiment.

FIG. 3 is an equivalent circuit diagram of a power source and a wireless power transmitter according to an embodiment.

FIG. 4 is an equivalent circuit diagram of a wireless power receiver according to an embodiment.

FIG. 5 is a block diagram showing a wireless power transmission system according to a first embodiment.

FIG. 6 is a view showing a method of transmitting power state information from a wireless power receiver.

FIGS. 7a to 7c are views showing an example of a signal which reflects power state information and is output from a controller of a wireless power receiver.

FIGS. 8a to 8c are views showing another example of a signal which reflects power state information and is output from a controller of a wireless power receiver.

FIGS. 9a and 9b are views showing a charging operation to a load according to the on/off state of a switch.

FIGS. 10a and 10b are views showing voltage supplied to a load according to the magnitude of wireless power.

FIG. 11 is a view showing voltage supplied to a load according to variation of wireless power.

FIG. 12 is a detailed view showing an information detector of a wireless power transmitter shown in FIG. 5.

FIGS. 13a to 13c are views showing a waveform generated from an information detector shown in FIG. 12.

FIG. 14 is a block diagram showing a wireless power transmission system according to a second embodiment.

FIG. 15 is a flowchart showing a power transmission control method in wireless power transmitters according to first and second embodiments shown in FIGS. 5 and 14.

FIG. 16 is a flowchart showing a power transmission control method in wireless power receivers according to first and second embodiments shown in FIGS. 5 and 14.

BEST MODE

Mode for Invention

In the description of the embodiments, it will be understood that, when a constituent element is referred to as being "on" or "under" another constituent element, it can be "directly" or "indirectly" on the other constituent element, or one or more intervening elements may also be present. In addition, the terminology of 'on (above)' and 'under (below)' may include both the meanings of 'upward' and 'downward' based on one constituent element.

First, prior to explaining a wireless terminal support, a system that reflects a general concept of transmitting wireless power will be described.

FIG. 1 is a view illustrating a wireless power transmission system according to an embodiment.

Referring to FIG. 1, the wireless power transmission system according to an embodiment may include a power source 100, a wireless power transmitter 200, a wireless power receiver 300 and a load 400.

According to one embodiment, the power source 100 may be included in the wireless power transmitter 200, but the embodiment is not limited thereto.

The wireless power transmitter 200 may include a transmitting induction coil 210 and a transmitting resonant coil 220.

The wireless power receiver 300 may include a receiving resonant coil 310, a receiving induction coil 320 and a rectifying unit 330.

Both terminals of the power source 100 may be connected to both terminals of the transmitting induction coil 210.

The transmitting resonant coil 220 may be spaced apart from the transmitting induction coil 210 by a predetermined distance.

The receiving resonant coil 310 may be spaced apart from the receiving induction coil 320 by a predetermined distance.

Both terminals of the receiving induction coil 320 may be connected to both terminals of the rectifying unit 330, and the load 400 may be connected to both terminals of the rectifying unit 330. According to one embodiment, the load 400 may be included in the wireless power receiver 300.

The power generated from the power source 100 is transmitted to the wireless power transmitter 200. The power received in the wireless power transmitter 200 is transmitted to the wireless power receiver 300 that makes resonance with the wireless power transmitter 200 due to a resonance phenomenon, that is, has the resonance frequency the same as that of the wireless power transmitter 200.

Hereinafter, the power transmission process will be described in more detail.

The power source 100 may generate AC power having a predetermined frequency and transfer the AC power to the wireless power transmitter 200.

The transmitting induction coil 210 and the transmitting resonant coil 220 are inductively coupled to each other. In other words, AC current is generated from the transmitting induction coil 210 due to the AC power received from the power supply apparatus 100, and the AC current is induced to the transmitting resonant coil 220 physically spaced apart from the transmitting induction coil 210 due to the electromagnetic induction.

Thereafter, the power received in the transmitting resonant coil 220 is transmitted to the wireless power receiver 300, which has the resonance frequency the same as that of the wireless power transmitter 200 through the frequency resonance, by resonance.

Power can be transmitted between two LC circuits, which are impedance-matched with each other, by resonance. The power transmitted by the resonance can be farther transmitted with higher efficiency when comparing with the power transmitted by the electromagnetic induction.

The receiving resonant coil 310 may receive power from the transmitting resonant coil 220 through the frequency resonance. The AC current may flow through the receiving resonant coil 310 due to the received power. The power received in the receiving resonant coil 310 may be transmitted to the receiving induction coil 320, which is inductively coupled to the receiving resonant coil 310, due to the electromagnetic induction. The power received in the receiving induction coil 320 is rectified by the rectifying unit 330 and transmitted to the load 400.

According to one embodiment, the transmitting induction coil 210, the transmitting resonant coil 220, the receiving resonant coil 310, and the receiving induction coil 320 may have a spiral structure or a helical structure, but the embodiment is not limited thereto.

The transmitting resonant coil 220 and the receiving resonant coil 310 may be resonantly coupled with each other such that power transmission is possible at the resonant frequency.

Since the transmitting resonant coil 220 is resonantly coupled with the receiving resonant coil 310, the power transmission efficiency between the wireless power transmitter 200 and the wireless power receiver 300 may be significantly improved.

As described above, the wireless power transmission system can transmit power in a resonance frequency scheme.

The embodiment may also transmit power through an electromagnetic induction scheme as well as the resonance frequency scheme.

That is, according to an embodiment, when the wireless power transmission system transmits power based on the electromagnetic induction, the transmitting resonant coil 220 included in the wireless power transmitter 200 and the receiving resonant coil 310 included in the wireless power receiver 300 may be omitted.

A quality factor and a coupling coefficient are important in the wireless power transmission. That is, the power transmission efficiency may be proportional to each of the quality factor and the coupling coefficient. Thus, as at least one of the quality factor and the coupling coefficient is increased, the power transmission efficiency may be improved.

The quality factor may refer to an index of energy that may be stored in the vicinity of the wireless power transmitter 200 or the wireless power receiver 300.

The quality factor may vary according to the operating frequency ω as well as a shape, a dimension and a material of a coil. The quality factor may be expressed as following equation 1:

$$Q=w*L/R \qquad \text{[Equation 1]}$$

In the equation 1, L refers to the inductance of a coil and R refers to resistance corresponding to the quantity of power loss caused in the coil.

The quality factor may have a value of 0 to infinity. When the quality factor has a greater value, the power transmission efficiency between the wireless power transmitter 200 and the wireless power receiver 300 may be more improved.

The coupling coefficient represents the degree of inductive magnetic coupling between a transmitting coil and a receiving coil, and has a value of 0 to 1.

The coupling coefficient may vary according to the relative position and the distance between the transmitting coil and the receiving coil.

FIG. 2 is an equivalent circuit diagram of the transmitting induction coil according to an embodiment.

As shown in FIG. 2, the transmitting induction coil 210 may include an inductor L1 and a capacitor C1, and a circuit having a desirable inductance and a desirable capacitance can be constructed by the inductor L1 and the capacitor C1.

The transmitting induction coil 210 may be constructed as an equivalent circuit in which both terminals of the inductor L1 are connected to both terminals of the capacitor C1. In other words, the transmitting induction coil 210 may be constructed as an equivalent circuit in which the inductor L1 is connected in parallel to the capacitor C1.

The capacitor C1 may include a variable capacitor, and impedance matching may be performed by adjusting the capacitance of the capacitor C1. The equivalent circuits of the transmitting resonant coil 220, the receiving resonant coil 310 and the receiving induction coil 320 may be equal or similar to the circuit shown in FIG. 2, but the embodiment is not limited thereto.

FIG. 3 is an equivalent circuit diagram of the power source and the wireless power transmitter according to an embodiment.

As shown in FIG. 3, the transmitting induction coil 210 and the transmitting resonant coil 220 may be constructed by using inductors L1 and L2 and capacitors C1 and C2 having predetermined inductances and capacitances, respectively.

FIG. 4 is an equivalent circuit diagram of the wireless power receiver according to an embodiment.

As shown in FIG. 4, the receiving resonant coil 310 and the receiving induction coil 320 may be constructed by using inductors L3 and L4, and capacitors C3 and C4 having predetermined inductances and capacitances, respectively.

The rectifying unit 330 may convert AC power transferred from the receiving induction coil 320 into DC power and may transfer the DC power to the load 400.

In detail, although not shown, the rectifying unit 330 may include a rectifier and a smoothing circuit. According to the embodiment, the rectifier may include a silicon rectifier and, as shown in FIG. 4, may be equivalent to a diode D1, but the embodiment is not limited thereto.

The rectifier may convert AC power transferred from the receiving induction coil 320 into DC power.

The smoothing circuit may remove AC components included in the DC power converted by the rectifier to output a smoothed DC power. According to an embodiment, as shown in FIG. 4, a rectifying capacitor C5 may be used as the smoothing circuit, but the embodiment is not limited thereto.

The DC power transferred from the rectifying unit 330 may be DC voltage or current, but the embodiment is not limited thereto.

The load 400 may be an arbitrary rechargeable battery or a device requiring the DC power. For example, the load 400 may refer to a battery.

The wireless power receiver 300 may be installed to an electronic appliance such as a portable phone, a laptop computer or a mouse requiring electric power. Thus, the receiving resonant coil 310 and the receiving induction coil 320 may have shapes corresponding to a shape of the electronic appliance.

According to the embodiment, the wireless power transmitter 200 may exchange information with the wireless power receiver 300 through in-band communication, but the embodiment is not limited thereto.

The in-band communication may refer to the communication for exchanging information between the wireless power transmitter 200 and the wireless power receiver 300 by using a signal having a frequency used in the wireless power transmission. To this end, the wireless power receiver 300 may further include a switch and may receive the power transmitted from the wireless power transmitter 200 through a switching operation of the switch or not. Thus, the wireless power transmitter 200 may detect an amount of power consumed in the wireless power transmitter 200, so that the wireless power transmitter 200 may recognize an on or off signal of the switch included in the wireless power receiver 300.

In detail, the wireless power receiver 300 may change an amount of power received in the wireless power receiver 300 by using the switch, so that the power consumed in the wireless power transmitter 200 may be changed. The wireless power transmitter 200 may obtain information about a state of the load 400 by sensing the change of consumed power.

The information about the state of the load 400 may include information about the charging state, that is, the current charging state and the tendency of charging state of the load 400. The load 400 may be included in the wireless power receiver 300.

The state information of the load 400 may be referred to as power state information. That is, since the embodiment is to determine whether the power received from the wireless power transmitter 200 is insufficient, excessive or sufficient for charging the load 400, it may be within the technical scope of the embodiment even if the state information is referred to as power state information.

The in-band communication will be described later in detail.

FIG. 5 is a block diagram showing a wireless power transmission system according to a first embodiment.

Referring to FIG. 5, the wireless power transmission system according to the first embodiment may include a power source 100, a wireless power transmitter 200, a wireless power receiver 300 and a load 400.

Since the power source 100 and the load 400 have been described above in detail, they will not be further described below.

According to the first embodiment, the wireless power transmitter 200 and the wireless power receiver 300 may exchange information with each other through the in-band communication scheme. The in-band communication scheme according to the first embodiment may not require a separate transmission module or a separate reception module for data communication as well as a separate communication frequency used for communication in the communication modules. Since the transmission module and the reception module are not necessary, there is no need to define the communication protocol between the transmission module and the reception module. Therefore, the in-band communication scheme according to the first embodiment may significantly reduce the cost and simplify the configuration of a device, so that the device can be minimized.

According to the in-band communication scheme of the first embodiment, for example, the wireless power receiver 300 may intentionally vary the amount of power received in the wireless power receiver 300. For instance, it is possible to vary the amount of power by periodically blocking the wireless power received in the wireless power receiver 300. Such a variation of wireless power in the wireless power receiver 300 may vary the amount of wireless power of the wireless power transmitter 200 adjacent to the wireless power receiver 300. This is because a transmitting coil 5 of the wireless power transmitter 200 interacts with a receiving coil 11 of the wireless power receiver 300.

For example, if an interval between the receiving coil 11 of the wireless power receiver 300 and the load 400 is blocked, current flowing through the receiving coil 11 of the wireless power receiver 300 may vary and the current variation of the receiving coil 11 may induce the current variation of the transmitting coil 5 of the wireless power transmitter 200.

Therefore, the wireless power transmitter 200 may obtain information including the state and request of the wireless power receiver 300 by detecting the current variation of the transmitting coil 5. In addition, the wireless power transmitter 200 may operate in response to the request of the wireless power receiver 300 based on the obtained information.

The wireless power receiver 300 may include the receiving coil 11, a modulator 13, a rectifier 330, a signal detector 17, a controller 19 and a charging control module 30.

The receiving coil 11 may receive the wireless power transmitted from the wireless power transmitter 200. The wireless power receiver 300 according to the first embodiment may receive the wireless power from the wireless power transmitter 200 through the electromagnetic induction scheme or the frequency resonance scheme.

As shown in FIG. 1, in the case of the frequency resonance scheme, the transmitting coil 5 of the wireless power transmitter 200 may include a transmitting induction coil 210 and a transmitting resonant coil 220 and the receiving coil 11 of the wireless power receiver 300 may include a receiving resonant coil 310 and a receiving induction coil 320.

In the case of the electromagnetic induction scheme, the transmitting resonant coil of the wireless power transmitter 200 and the receiving resonant coil of the wireless power receiver 300 may be omitted.

The wireless power received in the receiving coil 11 may be supplied to the rectifier 330. The rectifier 330 rectifies the wireless power and transmit the wireless power to the load 400.

The load 400 may be a chargeable device. The chargeable device may be installed in an electronic appliance requiring the charging operation. For instance, the electronic appliance may be a wireless terminal that transceives information in moving through the wireless communication. The wireless terminal may include a mobile device, a portable computer, or a navigator, but the embodiment is not limited thereto. For instance, the electronic appliance may include a household electronic appliance such as a television, a refrigerator or a washing machine.

The signal detector 17 may detect a signal output from the rectifier 330. The signal may be a voltage signal or a current signal, but the embodiment is not limited thereto. According to the first embodiment, the signal is limited to the voltage signal, but the embodiment is not limited thereto. The signal detector 17 may supply the detected voltage signal to the controller 19.

The controller 19 may control the overall operation of the wireless power receiver 300. The controller 19 may recognize the state information of the load 400 based on the voltage signal detected by the signal detector 17. A predetermined reference voltage may be set to the controller 19. According to the first embodiment, first and second reference voltages may be set to the controller 19, but the embodiment is not limited thereto. For example, the first reference voltage is a minimum voltage for charging the load 400, and the second reference voltage is a maximum voltage for safely charging the load 400.

The controller 19 may compare the voltage signal detected from the signal detector 17 with the first and second reference voltages to recognize the state of the load 400 according to the magnitude of the first and second reference voltages.

For instance, if the detected voltage is lower than the first reference voltage, the wireless power output from the rectifier 330 may be insufficient to charge the load 400. In this case, that is, in case of power shortage, the wireless power output from the rectifier 330 has to be increased.

For example, if the detected voltage has a value between the first and second reference voltages, the load 400 may be stably charged by the wireless power output from the rectifier 330.

In addition, if the detected voltage is higher than the second reference voltage, the load 400 may be overheated or damaged by the wireless power output from the rectifier 330. In this case, that is, in case of over power, the wireless power output from the rectifier 330 has to be reduced.

The controller 19 may create the state information that reflects the state of the load 400 by comparing the detected voltage with the first and second reference voltages.

The controller 19 may control the modulator 13 based on the state information. The controller 19 may create a control signal based on the state information and supply the control signal to the modulator 13. The control signal may be a pulse width modulation (PWM) signal. The control signal may include information about the state of the load 400 and the request of the wireless power transmitter 200 that requests the power control.

The PWM signal may vary. For example, a duty ratio of each cycle may vary. For instance, the duty ratio may be decreased in each cycle. That is, a pulse having the duty ratio of 100% may be generated in the first cycle, a pulse having the duty ratio of 80% may be generated in the second cycle, a pulse having the duty ratio of 60% may be generated in the third cycle, and a pulse having the duty ratio of 40% may be generated in the fourth cycle.

In contrast, the duty ratio may be increased in each cycle. At this time, the rate of increase or decrease of the duty ratio may be constant or random. Parameters related to the rate of increase or decrease of the duty ratio may be set in the controller 19, but the embodiment is not limited thereto.

The PWM signal may have a waveform as shown in FIGS. 7 and 8, but the embodiment is not limited thereto.

The modulator 13 may be modulated according to the control signal of the controller 19. Due to the modulation of the modulator 13, information may be supplied to the transmitting coil 5 of the wireless power transmitter 200 from the receiving coil 11.

As shown in FIG. 6, the modulator 13 may include a switch 14. The switch 14 may include a semiconductor transistor, but the embodiment is not limited thereto. The semiconductor transistor may include one of a bipolar junction transistor (BJT), a metal oxide silicon field effect transistor (MOSFET) and a metal insulating silicon field effect transistor (MISFET).

The controller 19 may generate the PWM signal based on the state information and send the PWM signal to the modulator 13. The PWM signal may be generated as shown in FIGS. 7 and 8, but the embodiment is not limited thereto.

The PWM signal may include a plurality of high levels, that is, pulses and a plurality of low levels. A width of a pulse having a high level may be defined as a pulse width. The low level may be lower than the pulse having the high level, but the embodiment is not limited thereto.

Referring to FIG. 7, each interval is defined as one cycle so that the same PWM signal may be generated in each interval. Referring to FIG. 8, a plurality of intervals are defined as one cycle so that the same PWM signal may be generated in every interval.

In this manner, since the same PWM signal is generated in each cycle, even when the error occurs due to noise included in the PWM signal in a specific cycle, the wireless power transmitter 200 may detect the state of the load 400 based on the PWM signals of other cycles, so that the malfunction caused by the error may be prevented.

As shown in FIG. 7a, if the state information represents the power shortage, the PWM signal including a plurality of pulses having pulse widths, which gradually increase, may be generated in the first interval. In addition, the PWM signal the same as that of the first cycle may be generated in the second interval. For example, the pulse widths may be increased in the sequence of 30%, 50%, 70% and 90%. In this manner, the PWM signal including a plurality of pulses having pulse widths, which gradually increase and have one cycle, may be generated in each interval.

As shown in FIG. 7b, if the state information represents the power overflow, the PWM signal including a plurality of pulses having pulse widths, which gradually decrease, may be generated in the first interval. In addition, the PWM signal the same as that of the first cycle may be generated in the second interval. For example, the pulse widths may be decreased in the sequence of 90%, 70%, 50% and 30%. In this manner, the PWM signal including a plurality of pulses having pulse widths, which gradually decrease and have one cycle, may be generated in each interval.

As shown in FIG. 7c, if the state information represents the power maintaining, the PWM signal including a plurality of pulses having the same pulse width may be generated in the first and second intervals. At this time, the pulse width is 50%. In this manner, the PWM signal including a plurality of pulses having the same pulse width and one cycle may be generated in each interval.

Although four pulse widths (30%, 50%, 70% and 90%) are illustrated in FIGS. 7a to 7c, the embodiment is not limited thereto.

As shown in FIG. 8a, if the state information represents the power shortage, the PWM signal including a plurality of pulses having the same pulse width may be generated in each interval and the pulse widths between the intervals may be different from each other. For example, the pulse widths may be increased in the sequence of 30%, 60%, and 90% in the first to third intervals.

As shown in FIG. 8b, if the state information represents the power overflow, the PWM signal including a plurality of pulses having the same pulse width may be generated in each interval and the pulse widths between the intervals may be different from each other. For example, the pulse widths may be decreased in the sequence of 90%, 60%, and 30% in the first to third intervals.

As shown in FIG. 8c, if the state information represents the power maintaining, the PWM signal including a plurality of pulses having the same pulse width may be generated in each interval and the pulse width between the intervals may be the same. For example, the pulse widths may be 50% in the first to third intervals.

The rate of increase of the pulse width described above may be expressed as the duty ratio. For example, the increase in the pulse width may refer to the increase in the duty ratio. In FIG. 7a, the duty ratio of each pulse may be increased in the sequence of 30%, 50%, 70% and 90% in one interval. In FIG. 7b, the duty ratio of each pulse may be decreased in the sequence of 90%, 70%, 50% and 30% in one interval. In FIG. 7c, the duty ratio of each pulse may be the same (50%) in one interval. Similarly, the duty ratio may vary as shown in FIGS. 8a to 8c.

Although three pulse widths (50%, 70% and 90%) are illustrated in FIGS. 8a to 8c, the embodiment is not limited thereto.

The modulator 13, in detail, the switch 14 may be controlled according to the PWM signal supplied from the controller 19. That is, the switch 14 may be turned on corresponding to the high level of the PWM signal and turned off corresponding to the low level of the PWM signal. Thus, the switch 14 may be repeatedly turned on/off corresponding to a plurality of high levels and low levels of the PWM signals.

When the switch 14 is turned on or off, the current flowing through the receiving coil 11 may be changed. For example, the current flowing through the receiving coil 11 when the switch 14 is turned off may be lower than the current flowing through the receiving coil 11 when the switch 14 is turned on, but the embodiment is not limited thereto.

In this manner, if the current flowing through the receiving coil 11 is periodically changed, the magnetic field of the receiving coil 11 is also changed, so that the magnetic field of the transmitting coil 5 of the wireless power transmitter 200 adjacent to the receiving coil 11 may be changed. As the magnetic field of the transmitting coil 5 is changed, the current flowing through the transmitting coil 5 may also be changed. Thus, the state of the load 400 can be detected by sensing the current of the transmitting coil 5. This will be described later.

When the wireless power having the over voltage is received in the wireless power receiver 200, the charging control module 30 may prevent the load 400 from being damaged by the over voltage. The charging control module 30 may convert the over voltage into a voltage suitable for charging the load 400, that is, into an optimal charging voltage even if the wireless power having the over voltage is received in the wireless power receiver 200, so that the load 400 can be continuously charged, improving the charging efficiency and shortening the charging time.

The charging control module 30 may include a switch 32, a capacitor 34, a comparator 36 and a charging controller 38.

The switch 32 may be connected between an output terminal of the rectifier 330 and one end of the capacitor 34. The switch 32 may be controlled to supply or block an output signal of the rectifier 330, that is, an output voltage V1 of the rectifier 330 to the load 400 under the control of the charging controller 38.

For example, if the switch 32 is turned on, the output voltage V1 of the rectifier 330 may be supplied to the load 400.

In addition, if the switch 32 is turned off, the output voltage V1 of the rectifier 330 may not be supplied to the load 400. If the output voltage V1 of the rectifier 330 is the over voltage higher than the optimal charging voltage, the switch 32 is turned off, so that the over voltage V1 may not be supplied to the load 400, thereby protecting the load 400.

The switch 32 may be a field effect transistor (FET) such as MOSFET or a bipolar junction transistor (BJT), but the embodiment is not limited thereto.

Although the switch 32 is disclosed in the first embodiment for the purpose of convenience, other devices having the function of switching may be used in place of the switch 32. For instance, an OP AMP may be used as the switch 32.

One end of the capacitor 34 may be connected between the switch 32 and the load 400 and the outer end of the capacitor 34 may be grounded. The capacitor 34 may be charged or discharged according to the turn on/off the switch 32.

In other words, when the switch 32 is turned on, the output voltage V1 of the rectifier 330 may be supplied to the load 400 and the capacitor 34 may be charged. If the switch is turned off, the output voltage V1 of the rectifier 330 may not be supplied to the load 400, but the voltage V2 charged in the capacitor 34 may be supplied to the load 400 so that the capacitor 34 may be discharged. The voltage V2 is a voltage applied to both terminals of the capacitor 34, that is, a voltage charged in the capacitor 34.

The comparator 36 may generate an output signal by comparing the voltage V2 charged in the capacitor 34, that is, the voltage supplied to the load 400 with the reference voltage Vref. The reference voltage Vref may be the optimal charging voltage.

For example, if the voltage V2 charged in the capacitor 34 is higher than the reference voltage Vref, the comparator 36 may output a low level signal, for instance, '0' as the output signal, but the embodiment is not limited thereto.

In addition, if the voltage V2 charged in the capacitor 34 is equal to or lower than the reference voltage Vref, the comparator 36 may output a high level signal, for instance, '1' as the output signal, but the embodiment is not limited thereto.

The charging controller 38 may generate the control signal to control the switch 32 based on the output signal of the comparator 36 and supply the control signal to the switch 32.

For example, when the output signal of the comparator 36 is the low level signal, the charging controller 38 may generate a low level control signal. Due to the low level control signal, the switch 32 is turned off, so that the output voltage V1 of the rectifier 330 is not supplied to the load 400, thereby preventing the load 400 from being damaged by the over voltage.

In addition, when the output signal of the comparator 36 is the high level signal, the charging controller 38 may generate a high level control signal. In this case, due to the high level control signal, the switch 32 is turned on, so that the output voltage V1 of the rectifier 330 is supplied to the load 400, thereby charging the load 400.

The charging controller 38 may be included in the controller 19, but the embodiment is not limited thereto.

Although not shown in the drawings, the charging controller 38 may be omitted and the switch 32 may be directly controlled according to the output signal of the comparator 36. That is, the comparator 36 may have the functions of comparison and control.

In detail, if the low level signal is output from the comparator 36, the switch 32 may be turned off by the low level signal. In addition, if the high level signal is output from the comparator 36, the switch 32 may be turned on by the high level signal.

As shown in FIGS. 9a and 10a, when the switch 32 is turned off, that is, when the output voltage V1 of the rectifier 330 is the over voltage higher than the optimal charging voltage, the output voltage V1 of the rectifier 330 may not be supplied to the load 400. In this case, if the voltage V2 is charged in the capacitor 34, the voltage V2 is supplied to the load 400 so that the load 400 may be charged. As the voltage V2 is supplied, the voltage applied to both terminals of the capacitor 34 may be reduced.

As shown in FIG. 9b, when the switch 32 is turned on, that is, when the output voltage V1 of the rectifier 330 is lower than the optimal charging voltage, the output voltage V1 of the rectifier 330 may be supplied to the load 400. At the same time, the output voltage V1 of the rectifier 330 may be charged in the capacitor 34. Thus, the voltage applied to both terminals of the capacitor 34 may be increased.

As described above, according to the first embodiment, when the over voltage is charged from the rectifier 330, the switch 32 is instantly turned off, thereby blocking the over voltage supplied to the load 400.

As shown in FIG. 10a, when the output voltage V1 lower than the reference voltage is continuously supplied from the rectifier 330, the voltage V2 applied to both terminals of the capacitor 34 may be the output voltage V1 of the rectifier 330, so the switch 32 is always turned on under the control of the comparator 36 and the charging controller 38, so that the output voltage V1 of the rectifier 330 may be continuously supplied to the load 400.

In contrast, as shown in FIG. 10b, when the output voltage V2, which is the over voltage higher than the reference voltage, is continuously supplied from the rectifier 330, the switch 32 may be alternately turned on and off, so that the voltage V2 applied to both terminals of the capacitor 34 may have the pulse waveform which is higher and lower than the reference voltage. The charging voltage V2 having the pulse waveform may be supplied to the load 400. Thus, even when the over voltage is output from the rectifier 330, the over voltage may be converted into the charging voltage V2 approximate to the reference voltage, so that the load 400 may be charged with the charging voltage V2, thereby improving the charging efficiency.

The voltage V2 applied to the both terminals of the capacitor 34 may be within the range of ±10% to ±30% based on the reference voltage.

For example, if the reference voltage is 5V, the voltage applied to the both terminals of the capacitor 34 may have the variable waveform in the range of 3.5V to 6.5V. If the voltage is less than 3.5V, the charging efficiency may be lowered. If the voltage exceeds 6.5V, the load 400 may be damaged.

In addition, if the reference voltage is 5V, the voltage applied to the both terminals of the capacitor 34 may be in the range of 4.5V to 5.5V.

Hereinafter, the details will be described.

Operation 1: In case that the output voltage V1 of the rectifier 330 is the over voltage higher than the optimal charging voltage, the voltage V2 applied to the both terminals of the capacitor 34 may be the output voltage V1 of the rectifier 330, and, since the voltage V2 applied to the both terminals of the capacitor 34 is higher than the reference voltage, the comparator 36 may output the low level signal and the switch 32 may be turned off under the control of the controller as shown in FIG. 9a. Thus, the output voltage V1 of the rectifier 330 may not be supplied to the capacitor 34. Although the output voltage V1 of the rectifier 330 is not charged in the capacitor 34 due to the switch 32, the voltage V2 charged in the capacitor 34 may be continuously supplied to the load 400, so that the voltage V2 applied to the both terminals of the capacitor 34 may be reduced.

Operation 2: In case that the voltage V2 applied to the both terminals of the capacitor 34 is continuously reduced to the level lower than the reference voltage, as shown in FIG. 9b, the switch 32 may be turned on under the control of the comparator 36 and the controller so that the output voltage V1 of the rectifier 330 may be supplied to the capacitor 34. Thus, the voltage V2 applied to the both terminals of the capacitor 34 may be increased and supplied to the load 400 as the charging voltage.

Operation 3: In case that the voltage V2 applied to the both terminals of the capacitor 34 is continuously increased to the level higher than the reference voltage, as shown in FIG. 9a, the switch 32 may be turned off under the control of the comparator 36 and the controller so that the output voltage V1 of the rectifier 330 may not be supplied to the capacitor 34. Since the voltage V2 that have been charged in the capacitor 34 is continuously supplied to the load 400, the voltage V2 applied to the both terminals of the capacitor 34 may be reduced.

As shown in FIG. 10b, when the output voltage, which is the over voltage higher than the charging voltage or the reference voltage, is continuously supplied from the rectifier 330, the above operations 1 to 3 may be continuously repeated, so that the damage to the load 400 caused by the over voltage may be prevented. In addition, since the over voltage is converted into the charging voltage approximate to the reference voltage and the charging voltage is continuously supplied to the load 400, the charging efficiency of the load 400 can be improved and the charging time can be shortened.

Meanwhile, as shown in FIG. 11, when the over voltage higher than the reference voltage and the voltage lower than the reference voltage are alternately received in the wireless power receiver, the load 400 may be continuously charged during a predetermined interval.

For instance, if the voltage lower than the reference voltage is received in the wireless power receiver during the first interval, the switch 32 of the charging control module 30 may be constantly turned on, so that the voltage lower than the reference voltage may be supplied to the load 400. Thus, the load 400 may be charged.

In addition, if the voltage received in the wireless power receiver is converted from the voltage lower than the reference voltage to the over voltage higher than the reference voltage during the second interval, the switch 32 of the charging control module 30 may be alternately turned on and off according to the magnitudes of the voltage applied to the both terminals of the capacitor 34 and the reference voltage, so that the over voltage may be converted into the charging voltage approximate to the reference voltage in the capacitor 34 and the charging voltage may be supplied to the load 400. Thus, the load 400 may be charged.

Further, if the voltage received in the wireless power receiver is converted from the over voltage higher than the reference voltage to the voltage lower than the reference voltage during the third interval, the switch 32 of the charging control module 30 may be constantly turned, so that the voltage lower than the reference voltage may be supplied to the load 400. Thus, the load 400 may be charged.

In addition, if the voltage received in the wireless power receiver is converted from the voltage lower than the reference voltage to the over voltage higher than the reference voltage during the fourth interval, the switch 32 of the charging control module 30 may be alternately turned on and off according to the magnitudes of the voltage applied to the both terminals of the capacitor 34 and the reference voltage, so that the over voltage may be converted into the charging voltage approximate to the reference voltage in the capacitor 34 and the charging voltage may be supplied to the load 400. Thus, the load 400 may be charged.

Therefore, even when the over voltage higher than the reference voltage is intermittently received in the wireless power receiver, the load 400 can be continuously charged without causing the damage to the load 400 by the over voltage, so that the charging efficiency of the load 400 can be improved and the charging time can be shortened.

Meanwhile, the wireless power transmitter 200 may include a power adjusting device 3, a transmitting coil 5, an information detector 7 and a controller 9.

The transmitting coil 5 may transmit the power supplied from the power source 100 to the receiving coil 11 of the wireless power receiver 300 through the electromagnetic induction scheme or the resonance frequency scheme.

As the current and magnetic field of the receiving coil 11 have been changed, the current and magnetic field of the transmitting coil 5 may also be changed.

The information detector 7 may detect the current variation in the transmitting coil 5. As shown in FIG. 12, the information detector 7 may include a current detecting device 21, a current sensing unit 23, a comparator 25 and an ADC 27, but the embodiment is not limited thereto.

The current detecting device 21 may be connected to the transmitting coil 5 to allow the current flow in the transmitting coil 5. One side of the current detecting device 21 may be connected to the transmitting coil 5 and the other side of the current detecting device 21 may be grounded, but the embodiment is not limited thereto.

The current detecting device 21 may include a resistor, but the embodiment is not limited thereto.

As shown in FIG. 13a, a current Id flowing through the current detecting device 21 may include a ripple signal having a saw-tooth shape. As described above, the ripple signal may be derived from the current variation of the receiving coil 11 which is caused by controlling the switches 32 and 14 of the modulator 13 according to the PWM signal supplied from the controller 19 of the wireless power receiver 300. For example, an upper region of the saw tooth of the ripple signal may correspond to the high level of the PWM signal and a region between the saw teeth may correspond to the low level of the PWM signal, but the embodiment is not limited thereto.

In other words, as the current of the receiving coil 11 varies by controlling the switches 32 and 14 of the modulator 13 according to the PWM signal supplied from the controller 19 of the wireless power receiver 300, the current in the transmitting coil 5 of the wireless power transmitter 200 may repeatedly increase or decrease in the shape of saw tooth. At this time, the saw teeth may have different sizes corresponding to the pulse width or duty ratio of the PWM signal supplied from the controller 19 of the wireless power receiver 300.

The current sensing unit 23 may sense the current ID flowing through the current detecting device 21.

The current sensing unit 23 may have first and second input terminals connected to first and second nodes of the current detecting device 21, respectively. Thus, the current sensing unit 23 may sense the current ID flowing through the current detecting device 21 disposed between the first and second input terminals and convert the current ID into a first voltage signal as shown in FIG. 13*b*.

The first voltage signal may have a shape similar to a shape of the current signal. That is, the first voltage signal may include a ripple signal having the saw-tooth shape.

The comparator 25 may have first and second input terminals, in which the first input terminal may be connected to an output terminal of the current sensing unit 23 and the second input terminal may be connected to a reference voltage input line.

A reference voltage signal Vref may be input into the comparator 25 through the second input terminal. The reference voltage signal Vref may be a DC voltage signal. An output signal of the current sensing unit 23, that is, the first voltage signal may be input into the comparator 25 through the first input terminal.

As shown in FIG. 13*c*, the comparator 25 may generate a second voltage signal including a plurality of pulses having square waves based on the first voltage signal of the current sensing unit 23 and the reference voltage signal.

The reference voltage signal Vref may be defined between an uppermost point and a lowermost point of the saw tooth of the first voltage signal.

The comparator 25 may process a part of the first voltage signal, which is higher than the reference voltage signal, as the high level and may process a part of the first voltage signal, which is lower than the reference voltage signal, as the low level. Therefore, the second voltage signal including the high level higher than the reference voltage signal and the low level lower than the reference voltage signal may be generated. The high level and the low level may be defined as one cycle. The high level may be defined as the pulse.

In the second voltage signal output from the comparator 25, the pulses may have the same width or different widths. For example, the pulses may have different widths, which are gradually increased or decreased, or the same width.

The second voltage signal output from the comparator 25 may be supplied to the ADC 27.

The analog-digital converter (ADC) 27 may convert the second voltage signal output from the comparator 25 into a digital voltage signal. The digital voltage signal may be supplied to the controller 9.

As described above, the communication, which is performed by using only the current variation in the receiving coil 11 and the transmitting coil 5 without the communication module, may be referred to as the in-band communication.

Finally, the information detector 7 may supply the information requested from the wireless power receiver 300 (hereinafter referred to as request information) to the controller 9.

The controller 9 may control the overall operation of the wireless power transmitter 200. The controller 9 may recognize the request of the wireless power receiver 300 based on the request information supplied from the information detector 7. In other words, the controller 9 may recognize the state of the load 400 and the request of the wireless power receiver 300 based on the digital voltage signal supplied from the information detector 7, in detail, the ADC 27.

For example, when the pulse width of the second voltage signal is gradually increased, the controller 9 may recognize the lack of the power supplied to the load 400 and the request of the wireless power receiver 300 to increase the power.

The controller 9 may control the power to be supplied to the wireless power receiver 300 by controlling the power adjusting device 3 based on the request of the wireless power receiver 300 detected from the information detector 7.

For example, when the wireless power receiver 300 requests to increase the power, the controller 9 may control the power adjusting device 3 to increase the power supplied from the power source 100. The increased power may be supplied to the transmitting coil 5 and the transmitting coil 5 may supply the increased power to the wireless power receiver 300 through the electromagnetic induction scheme or the resonance frequency scheme. The receiving coil 11 of the wireless power receiver 300 may receive the increased power and supply the increased power to the load 400 through the rectifier 330.

In addition, when the wireless power receiver 300 requests to decrease the power, the controller 9 may control the power adjusting device 3 to decrease the power supplied from the power source 100. The decreased power may be supplied to the transmitting coil 5 and the transmitting coil 5 may supply the decreased power to the wireless power receiver 300 through the electromagnetic induction scheme or the resonance frequency scheme. The receiving coil 11 of the wireless power receiver 300 may receive the decreased power and supply the decreased power to the load 400 through the rectifier 330.

According to the first embodiment, the power adjusting device 3 is disposed between the power source 100 and the transmitting coil 5, but the embodiment is not limited thereto. That is, the power adjusting device 3 may be included in the power source 100. In this case, the power of the power source 100 may be controlled under the control of the controller 9 and the controlled power may be supplied to the transmitting coil 5.

FIG. 14 is a block diagram showing a wireless power transmission system according to a second embodiment.

The second embodiment is similar to the first embodiment except that the comparator 36 and the charging controller 38 are omitted.

Referring to FIG. 14, the wireless power transmission system according to the second embodiment may include a power source, a wireless power transmitter 200, a wireless power receiver 300 and a load 400.

The wireless power transmitter 200 may include a power adjusting device 3, a transmitting coil 5, an information detector 7 and a controller 9. Since the constituent elements of the wireless power transmitter 200 have already been described above, they will not be further described below and details thereof will be comprehended from the first embodiment.

The wireless power receiver 300 may include a receiving coil 11, a modulator 13, a rectifier 330, a signal detector 17, a controller 19 and a charging control module 40. The charging control module 40 may include a switch 32 and a capacitor 34. Since the constituent elements of the wireless power receiver 300 have already been described above, they will not be further described below and details thereof will be comprehended from the first embodiment.

In the second embodiment, the controller 19 may have the functions of the comparator 36 and the charging controller 38 according to the first embodiment.

The controller 19 may compare the voltage V2 applied to both terminals of the capacitor 34 with a predetermined reference voltage Vref and turn on or off the switch 32 based on the comparison result.

Although not shown in the drawing, a signal detector may be disposed between the capacitor 34 and the load 400 and the signal detector may detect the voltage applied to the both terminals of the capacitor 34 to supply the voltage to the controller.

In addition, the voltage applied to the both terminals of the capacitor 34 may be directly supplied to the controller without the signal detector and the controller may process the voltage applied to the both terminals of the capacitor 34 to compare the voltage with the reference voltage, if necessary.

For example, if the voltage V2 applied to the both terminals of the capacitor 34 is higher than the reference voltage, the switch 32 may be turned off by the low level control signal generated from the controller, so that the output voltage V1 of the rectifier 330 may not be supplied to the capacitor 34. Even in this case, if there is voltage V 2 previously charged in the capacitor 34, the voltage V2 may be supplied to the load 400.

In addition, if the voltage V2 applied to the both terminals of the capacitor 34 is lower than the reference voltage, the switch 32 may be turned on by the high level control signal generated from the controller, so that the output voltage V1 of the rectifier 330 may be supplied to the capacitor 34. Thus, the output voltage V1 may be charged in the capacitor 34 and supplied to the load 400.

FIG. 15 is a flowchart showing a power transmission control method in wireless power transmitters according to first and second embodiments shown in FIGS. 5 and 14.

Referring to FIGS. 5, 6, 12, 14 and 15, the wireless power transmitter 200 may detect whether the wireless power receiver 300 is located in a position for receiving the wireless power (S501). A relatively low wireless power may be transmitted to allow the wireless power transmitter 200 to detect the wireless power receiver 300. At this time, the wireless power may be remarkably lower than the wireless power used for charging the load 400 and it is sufficient if the wireless power receiver 300 can be detected by the wireless power.

If the wireless power receiver 300 closely approaches the wireless power transmitter 200, the wireless power receiver 300 may receive the wireless power transmitted from the wireless power transmitter 200. Since the wireless power transmission is achieved through the electromagnetic induction scheme or the resonance frequency scheme between the wireless power transmitter 200 and the wireless power receiver 300, as the wireless power receiver 300 receives the wireless power, the current flowing through the transmitting coil 5 of the wireless power transmitter 200 may vary. By detecting the current variation, the wireless power transmitter 200 may detect whether the wireless power receiver 300 is present in the vicinity of the wireless power transmitter 200. However, the above description is to illustrate one embodiment only, and the presence of the wireless power receiver 300 may be detected by other methods.

After the wireless power receiver 300 has been detected, it is detected whether there is information transmitted from the wireless power receiver 300 (S503). Since the information detection has already been described in detail with reference to FIG. 12, it will not be further described below.

If the information is not detected, it is determined whether it is below the detection limit (S505) or whether no information is detected by at least five times (S507).

If it is determined that it is below the detection limit or no information is detected by at least five times, the procedure returns to step (S501) to detect the wireless power receiver 300. In this case, it is regarded that the wireless power receiver 300 is out of the range for receiving the wireless power.

Then, the controller 9 of the wireless power transmitter 200 may analyze the detected information to recognize whether there is a request to increase the wireless power from the wireless power receiver 300 (S511).

If it is determined that the wireless power receiver 300 requests the increase of the wireless power, the controller 9 may increase the wireless power by controlling the power adjusting device 3 (S513). The increased wireless power may be transmitted through the transmitting coil 5.

If it is determined that the wireless power receiver 300 requests the decrease of the wireless power (S515), the controller 9 may decrease the wireless power by controlling the power adjusting device 3 (S517).

If it is determined that the wireless power receiver 300 requests the maintain of the wireless power (S521), the controller 9 may maintain the wireless power by controlling the power adjusting device 3 (S523).

FIG. 16 is a flowchart showing a power transmission control method in wireless power receivers according to first and second embodiments shown in FIGS. 5 and 14.

Referring to FIGS. 5, 6, 12, 14 and 15, the signal detector 17 of the wireless power receiver 300 may detect the signal from the rectifier 330 (S601). Since the signal detection has already been described in detail with reference to FIG. 6, it will not be further described below.

The controller 19 may compare the signal detected from the signal detector 17 with the first and second reference voltages.

That is, it is determined whether the detected signal is lower than the first reference voltage (S603).

If the detected signal is lower than the first reference voltage, the controller 19 modulates the modulator 13 by generating the PWM signal to request the increase of the wireless power and transmits the PWM signal to the wireless power transmitter 200 through the receiving coil 11 (S605).

If the detected signal is higher than the second reference voltage (S607), the controller 19 modulates the modulator 13 by generating the PWM signal to request the decrease of the wireless power and transmits the PWM signal to the wireless power transmitter 200 through the receiving coil 11 (S609).

If it is determined that the detected signal is between the first and second reference voltages (S607), the controller 19 modulates the modulator 13 by generating the PWM signal to request the maintain of the wireless power and transmits the PWM signal to the wireless power transmitter 200 through the receiving coil 11 (S611).

Then, the controller 19 determines whether a predetermined time has elapsed (S613). If the predetermined time has elapsed, the controller 19 controls the signal detector 17 to perform again the signal detection. According to the first and second embodiments, data can be transceived through the in-band communication by using the transmitting coil 5 of the wireless power transmitter 200 and the receiving coil 11 of the wireless power receiver 300. However, the in-band communication may interfere with the wireless power transmission. For this reason, in order to minimize the interference, the data communication through the in-band communication scheme may be stopped for a predetermined time to facilitate the wireless power transmission. In this case, the charging efficiency of the load 400 can be improved.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

DESCRIPTION OF REFERENCE NUMERALS

3: power adjusting device
5: transmitting coil
7: information detector
9, 19: controller
11: receiving coil
13: modulator
14: switch
17: signal detector
21: resistor
23: current sensing unit
25: comparator
27: ADC
30, 40: charging control module
32: switch
34: capacitor
36: comparator
38: charging controller
100: power source
200: wireless power transmitter
210: transmitting induction coil
220: transmitting resonant coil
300: wireless power receiver
310: receiving resonant coil
320: receiving induction coil
330: rectifier
400: load

The invention claimed is:

1. A wireless power receiver for transferring a power received from a wireless power transmitter to a load, the wireless power receiver comprising:
a receiving coil configured to receive an AC power from the wireless power transmitter;
a rectifier configured to rectify the AC power into a DC voltage;
a capacitor configured to charge the rectified DC voltage;
a comparator configured to compare a voltage of the capacitor with a reference voltage and generate an output signal based on the comparison result to control a supply of the DC voltage to the load;
a controller configured to recognize a state of the load and generate a control signal based on the state of the load; and
a modulator disposed between the receiving coil and the rectifier and modulated according to the control signal of the controller,
wherein information is supplied from the receiving coil to a transmitting coil of the wireless power transmitter by modulation of the modulator.

2. The wireless power receiver of claim 1, further comprising:
a switch connected between the rectifier and the capacitor,
wherein the switch is switched based on the output signal of the comparator to control a supply of the DC voltage to the load.

3. The wireless power receiver of claim 1, further comprising:
a signal detector configured to detect a signal from the rectifier,
wherein the controller is configured to recognize the state of the load based on the signal detected by the signal detector.

4. The wireless power receiver of claim 1, wherein the reference voltage is an optimal charging voltage suitable for charging the load.

5. The wireless power receiver of claim 2, wherein when the voltage of the capacitor is higher than the reference voltage, the switch is open based on the output signal of the comparator and the voltage of the capacitor is supplied to the load.

6. The wireless power receiver of claim 5, wherein, after the capacitor is discharged due to the supply of the voltage of the capacitor to the load, when the voltage of the capacitor is lower than the reference voltage, the switch is turned on based on the output signal of the comparator and the DC voltage is charged in the capacitor so that the voltage of the capacitor is increased.

7. The wireless power receiver of claim 6, wherein when the voltage of the capacitor is higher than the reference voltage due to the increase of the voltage in the capacitor, the switch is open based on the output signal of the comparator and the voltage of the capacitor is supplied to the load.

8. The wireless power receiver of claim 7, wherein while the DC voltage higher than the reference voltage is being supplied, the switch is repeatedly turned on and off and the capacitor is repeatedly charged and discharged so that the voltage of the capacitor is charged in the load.

9. The wireless power receiver of claim 8, wherein the voltage of the capacitor has a pulse waveform approximate to a pulse waveform of the reference voltage due to the charge and discharge of the capacitor.

10. The wireless power receiver of claim 9, wherein the voltage of the capacitor is within a range of ±10% to ±30% based on the reference voltage.

11. The wireless power receiver of claim 2, wherein when the voltage of the capacitor is lower than the reference voltage, the switch is turned on based on the output signal of the comparator and the DC voltage is supplied to the capacitor and the load.

12. A wireless power receiver for transferring a power received from a wireless power transmitter to a load, the wireless power receiver comprising:
a receiving coil configured to receive an AC power from the wireless power transmitter;

a rectifier configured to rectify the AC power into a DC voltage;

a capacitor configured to charge the rectified DC voltage;

a modulator disposed between the receiving coil and the rectifier; and a controller configured to compare a voltage of the capacitor with a reference voltage, generate a first control signal based on the comparison result to control a supply of the DC voltage to the load, recognize a state of the load, and generate a second control signal based on the state of the load, wherein the modulator is modulated according to the second control signal of the controller, and wherein information is supplied from the receiving coil to a transmitting coil of the wireless power transmitter by modulation of the modulator.

13. The wireless power receiver of claim 12, further comprising:

a switch connected between the rectifier and the capacitor, wherein the switch is switched based on the first control signal of the controller to control a supply of the DC voltage to the load.

14. The wireless power receiver of claim 12, further comprising:

a signal detector configured to detect a signal from the rectifier, wherein the controller is configured to recognize the state of the load based on the signal detected by the signal detector.

15. The wireless power receiver of claim 12, wherein the reference voltage is an optimal charging voltage suitable for charging the load.

16. The wireless power receiver of claim 13, wherein, after the capacitor is discharged due to the supply of the voltage of the capacitor to the load, when the voltage of the capacitor is lower than the reference voltage, the switch is turned on based on the first control signal of the controller and the DC voltage is charged in the capacitor so that the voltage of the capacitor is increased.

* * * * *